United States Patent
Lee et al.

(10) Patent No.: US 12,069,382 B2
(45) Date of Patent: Aug. 20, 2024

(54) ELECTRONIC DEVICE AND METHOD FOR GENERATING IMAGES BY PERFORMING AUTO WHITE BALANCE

(71) Applicant: Samsung Electronics Co., Ltd., Gyeonggi-do (KR)

(72) Inventors: Jaemyung Lee, Gyeonggi-do (KR); Sungoh Kim, Gyeonggi-do (KR); Jiyoon Park, Gyeonggi-do (KR); Wonseok Song, Gyeonggi-do (KR); Hyunsik Yu, Gyeonggi-do (KR); Kihuk Lee, Gyeonggi-do (KR); Sanghyeon Lim, Gyeonggi-do (KR); Dongyoung Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 158 days.

(21) Appl. No.: 17/548,715

(22) Filed: Dec. 13, 2021

(65) Prior Publication Data
US 2022/0103795 A1 Mar. 31, 2022

Related U.S. Application Data

(63) Continuation of application No. PCT/KR2021/006331, filed on May 21, 2021.

(30) Foreign Application Priority Data

May 21, 2020 (KR) .......................... 10-2020-0061066

(51) Int. Cl.
*H04N 23/88* (2023.01)
*G06N 20/00* (2019.01)
(Continued)

(52) U.S. Cl.
CPC ............. *H04N 23/88* (2023.01); *G06N 20/00* (2019.01); *G06T 7/11* (2017.01); *G06T 7/194* (2017.01)

(58) Field of Classification Search
CPC ........... G06N 20/00; G06T 7/11; G06T 7/194; H04N 23/88
See application file for complete search history.

(56) References Cited

U.S. PATENT DOCUMENTS

| | | | |
|---|---|---|---|
| 7,602,969 B2 | 10/2009 | Yamada et al. | |
| 8,310,561 B2 | 11/2012 | Misawa et al. | |

(Continued)

FOREIGN PATENT DOCUMENTS

| | | |
|---|---|---|
| JP | 2007-129622 A | 5/2007 |
| JP | 2008-52428 A | 3/2008 |

(Continued)

OTHER PUBLICATIONS

Korean Office Action dated May 31, 2024.

*Primary Examiner* — Antoinette T Spinks
(74) *Attorney, Agent, or Firm* — Cha & Reiter, LLC

(57) ABSTRACT

An electronic device and method are disclosed. The electronic device includes a camera, a memory and at least one processor. The processor implements the method, including: acquiring image data through a camera, partitioning, by at least one processor, the acquired image data into a first region and a second region according to a designated scheme, acquiring a first auto-white-balancing (AWB) parameter of the first region and a second AWB parameter of the second region, and executing AWB on the image data using both the first AWB parameter and the second AWB parameter.

20 Claims, 11 Drawing Sheets

(51) Int. Cl.
    *G06T 7/11*           (2017.01)
    *G06T 7/194*         (2017.01)

(56) References Cited

U.S. PATENT DOCUMENTS

| | | | |
|---|---|---|---|
| 2015/0116534 A1* | 4/2015 | Kim | H04N 25/134 |
| | | | 348/223.1 |
| 2015/0326841 A1* | 11/2015 | Cho | H04N 23/88 |
| | | | 348/223.1 |
| 2020/0053332 A1 | 2/2020 | Seok | |
| 2020/0213533 A1* | 7/2020 | Zhang | G06T 7/174 |
| 2020/0334843 A1* | 10/2020 | Kasuya | G05D 1/0251 |
| 2021/0272303 A1* | 9/2021 | Miao | G06V 10/25 |
| 2024/0073505 A1* | 2/2024 | Kubota | H04N 23/56 |

FOREIGN PATENT DOCUMENTS

| | | |
|---|---|---|
| JP | 2016-220031 A | 12/2016 |
| JP | 2019-124537 A | 7/2019 |
| KR | 2007-129622 A | 5/2007 |
| KR | 10-2008-0077742 A | 8/2008 |
| KR | 20080077742 A1 * | 8/2008 |
| KR | 10-2015-0128168 A | 11/2015 |
| KR | 10-2018-0108201 A | 10/2018 |

\* cited by examiner

ELECTRONIC DEVICE AND METHOD FOR GENERATING IMAGES BY PERFORMING AUTO WHITE BALANCE

CROSS-REFERENCE TO RELATED APPLICATION(S)

This application is a continuation of International Application No. PCT/KR2021/006331, filed on May 21, 2021, which claims priority to Korean Patent Application. No. 10-2020-0061066, filed on May 21, 2020 in the Korean Intellectual Property Office, the disclosures of which are herein incorporated by reference.

BACKGROUND

1) Field

Certain embodiments relate to an electronic device and a method for generating images, and, more specifically, generating images including application of auto white balance (AWB).

2) Description of Related Art

When images of a subject are captured using image processing devices, the captured colors may give different impressions depending on the color temperature. For example, even if the original color of the subject is white, the captured image may give the impression of a red color instead, if the color temperature is low according to the lighting or the light source. Similarly, the image may give the impression of a blue color if the color temperature is high.

The above information is presented as background information only to assist with an understanding of the disclosure. No determination has been made, and no assertion is made, as to whether any of the above might be applicable as prior art with regard to the disclosure.

SUMMARY

White balance (WB) technologies include separating an image captured from mixed light into one image captured with regard to ambient light (excluding flash light) and another image captured by flash light (excluding ambient light), subjecting the separated images to WB adjustment according to parameters configured based on the color temperature of each light, and synthesizing the resultant images.

The WB-related technologies include also include a technology for detecting a specific object included in an image, acquiring a WB correction value in a detected specific area and another WB correction value in an area other than the specific area, and comparing the same, thereby determining whether there is a single light source or multiple light sources.

When images are captured in an environment having composite light sources, it is difficult to perform auto white balance (AWB) such that all color temperatures of the different light sources are satisfied.

In addition, when AWB is performed by predicting the light source of the main subject, if WB is focused on one light source, a problem occurs to the WB of an area affected by another light source.

The present disclosure remedies the defects noted above with regard to WB and AWB technologies.

An electronic device according to an embodiment may include acquire image data through the camera, partition the acquired image into at least one first region and a second region according to a designated scheme, acquire a first auto-white-balancing (AWB) parameter of the first region, and a second AWB parameter of the second region, and execute AWB on the acquired image data using both the first AWB parameter and the second AWB parameter.

A method for operating an electronic device according to an embodiment may include acquiring image data through a camera, partitioning, by at least one processor, the acquired image data into a first region and a second region according to a designated scheme, acquiring a first auto-white-balancing (AWB) parameter of the first region and a second AWB parameter of the second region, and executing AWB on the image data using both the first AWB parameter and the second AWB parameter.

According to certain embodiments, when a composite light source environment is confirmed by using image segmentation based on machine learning or by using distance information, AWB appropriate for each light source may be performed, thereby generating resultant images satisfying all different composite light sources.

Advantageous effects obtainable based on certain embodiments are not limited to the above-mentioned advantageous effects, and other advantageous effects not mentioned herein will be clearly understood from the following description by those skilled in the art to which the disclosure pertains.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
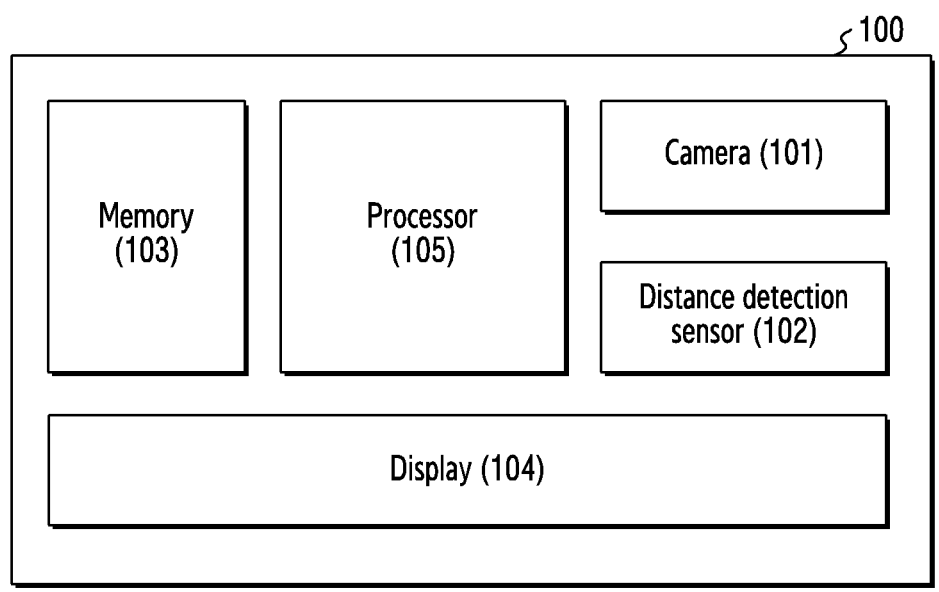
FIG. 1 illustrates a configuration of an electronic device according to an embodiment.

FIG. 1 illustrates a configuration of an electronic device according to an embodiment.

An electronic device 100 according to an embodiment may include a camera 101, a distance detection sensor 102, a memory 103, a display 104, and a processor 105.

In certain embodiments, some of the elements included in the electronic device 100 illustrated in FIG. 1 may be omitted, or other elements may be added to the electronic device 100. For example, the electronic device 100 may not include the distance detection sensor 102.

The camera 101 according to an embodiment may acquire image data relating to an external environment of the electronic device 100. For example, the camera 101 may acquire image data relating to an object, a background, and a light source. The image data may include at least one of color (or RGB) data, color temperature data, and infrared (IR) data.

The distance detection sensor 102 according to an embodiment may acquire distance data relating to an external environment. For example, the distance detection sensor 102 may acquire distance data from the electronic device 100 to a specific object and distance data from the electronic device 100 to a specific region. In addition, the distance detection sensor 102 may be a time of flight (ToF) sensor.

The memory 103 according to an embodiment may store acquired data. For example, the memory 103 may store image data acquired through the camera 101, and may store distance data acquired through the distance detection sensor (or ToF sensor) 102.

The display 104 according to an embodiment may output an image based on image data. The display 104 may output an image (e.g., output a preview image) in real time based on image data acquired through the camera 101. In addition, the display 104 may be electrically connected to the memory 103, and may output an image based on image data stored in the memory 103.

The processor 105 according to an embodiment may be electrically connected to the camera 101, the distance detection sensor 102, the memory 103, and the display 104. In addition, the processor 105 may control the operations of the camera 101, the distance detection sensor 102, the memory 103, and the display 104 described above.

The electronic device 100 and internal elements of the electronic device (e.g., the camera 101, the distance detection sensor 102, the memory 103, and the display 104) according to certain embodiments may perform other operations in addition to the above-described operations. In addition, other configurations may be included therein as well as the above-described configurations.

Figure 2:
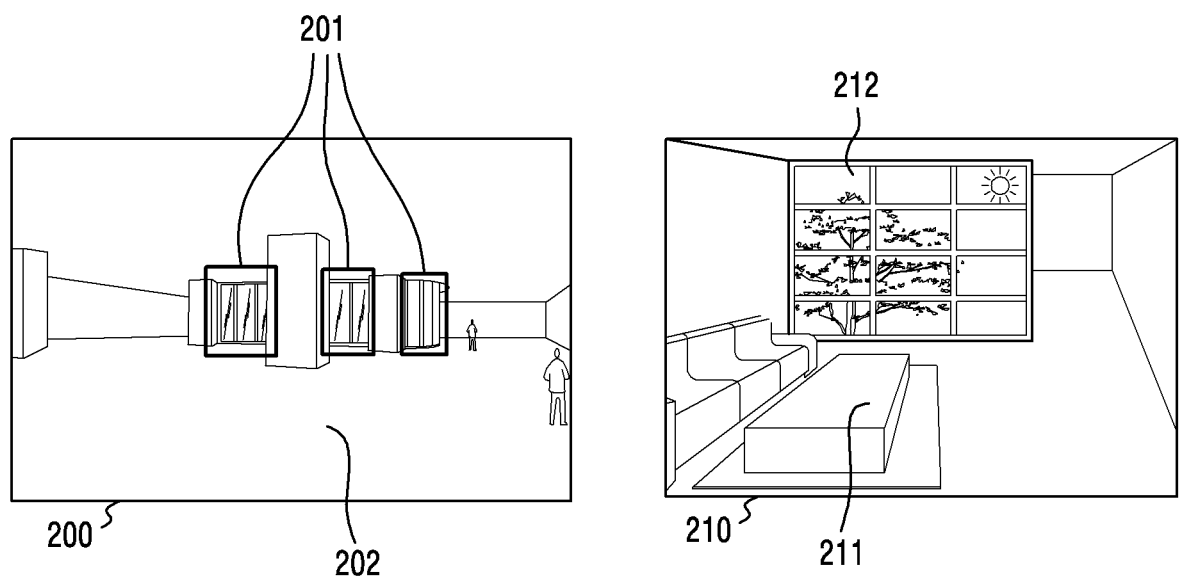
FIG. 2 illustrates a complex light source environment according to an embodiment.

FIG. 2 illustrates an environment having complex lighting from multiple light sources (e.g., a "complex light source environment"), according to an example embodiment.

Image data 200 may be acquired in the complex light source environment according to an embodiment may include a region(s) 201 and a region 202. The region 201 may be a first region having a high incidence of outdoor lighting via the presence of a window or some opening allowing entry of outdoor light. The region 202 may be the remaining regions of the image, excepting the region(s) 201 in the image data 200 of the complex light source environment. Accordingly, the region 201 may be a region primarily affected by an outdoor light source, and the region 202 may be a region primarily affected by an indoor light source. For example, when there is a window inside a building in which the indoor light source is turned on, the region 201 may be to include a window, and the region 202 may be a region in which no window is disposed.

Image data 210 acquired in a complex light source environment according to another embodiment may include a region 211 and a region 212. The region 212 may be the remaining region excepting the region 211 in the image data 210 of the complex light source environment. The region 211 may be a region highly affected by an indoor light source, and the region 212 may be a region highly affected by an outdoor light source. For example, if there is a large window (e.g., a whole glass or a wall surface configured by windows) inside a building where the indoor light source is turned on, the region 211 may be a "near-distance region" where no window exists (so-called because the depicted region is in closer proximity to the camera), and the region 212 may be a "far-distance region" where the window exists (so-called because the depicted region is more distal from the camera).

The color temperature may be different for each of the regions 201, 202, 211, and 212 in the image data 200, 210 of the complex light source environments according to an embodiment, and parameters (or AWB parameters) for performing AWB thereon may be different. In addition, when WB is performed for one light source in an environment of a complex light source and excluding the other light source (e.g., one of an indoor light source and an outdoor light source), an image of a region for the other light source may not be properly captured.

Figure 3:
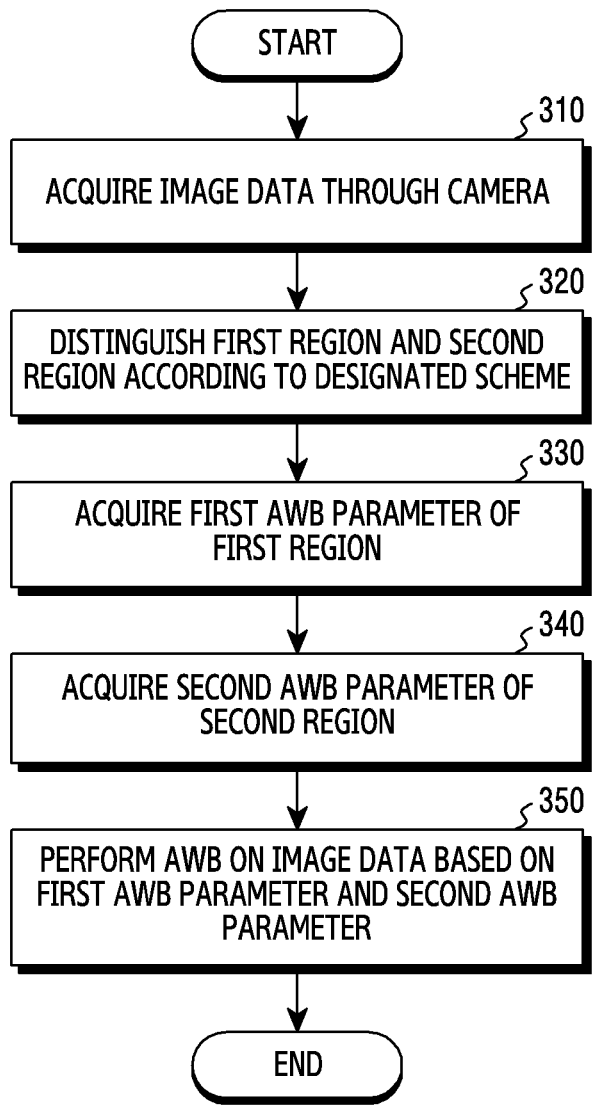
FIG. 3 is a flowchart schematically illustrating application of AWB to a plurality of regions by an electronic device according to an embodiment.

FIG. 3 is a flowchart illustrating application of AWB to a plurality of regions by an electronic device according to an example embodiment.

According to an embodiment, in operation 310, the electronic device may acquire image data through a camera. For example, the electronic device 100 may acquire image data including an image of an environment, including, e.g., RGB data, color temperature data, and infrared (IR) data through the camera 101 under the control of the processor 105.

According to an embodiment, in operation 320, the electronic device may partition (e.g., distinguish, divide, etc.) the acquired image into one or more regions, including, for example, one or more first regions and a second region according to a designated scheme.

As noted above with respect to FIG. 2, the first region(s) and the second region may be selected for partitioning according to a type and/or degree of lighting affecting each region. For example, the first region(s) may be selected based on the presence of a high level of outdoor lighting. The second region may be portions of the image excepting the first region(s), and are more impacted by indoor lighting.

In an embodiment, the designated scheme may include machine learning-based image segmentation. In another embodiment, the designated scheme may include region setting based on distances detected through the distance detection sensor 102. In addition, the region setting may be configured to use both the machine learning, and distance detection sensor 102.

In an embodiment, the electronic device 100 may partition, set and/or distinguish regions (e.g., a first region and a second region) out of the image based on the designated scheme under the control of the processor 105. For example, the electronic device 100 may divide the acquired image data into a first region and a second region according to machine learning-based image segmentation, under the control of the processor 105. In addition, the electronic device 100 may divide the image data acquired according to the region setting based on the distance detection sensor 102 into a first region and a second region under the control of the processor 105. For another example, the electronic device 100 may divide the acquired image data into a first region frame and a second region frame according to the machine learning-based image segmentation or the region setting based on the distance detection sensor 102 under the control of the processor 105.

According to another embodiment, the electronic device 100 may set the first region as the entire region of image data, and may select the second region as a specific region disposed within the first region, based on the designated scheme under the control of the processor 105.

According to an embodiment, in operation 330, the electronic device may acquire a first AWB parameter of the first region(s). For example, the electronic device 100 may set a specific region as a first region frame or a first region frame according to a designated scheme (e.g., machine learning-based image segmentation or region setting based on the distance detection sensor 102) under the control of the processor 105. The electronic device 100 may acquire a first AWB parameter for performing AWB on the first region or the first region frame under the control of the processor 105.

According to an embodiment, in operation 340, the electronic device may acquire a second AWB parameter of the second region. For example, the electronic device 100 may distinguish a specific region as a second region or a second region frame according to the designated scheme (e.g., machine learning-based image segmentation or region setting based on the distance detection sensor 102) under the control of the processor 105. The electronic device 100 may acquire a second AWB parameter for performing AWB on the second region or the second region frame under the control of the processor 105.

According to an embodiment, the sequence of operations 330 and 340 may not be limited to the descriptions given. For example, the electronic device 100 may perform operation 340 before operation 330 under the control of the processor 105. In addition, the electronic device 100 may perform operations 330 and 340 in parallel or simultaneously under the control of the processor 105.

According to an embodiment, in operation 350, the electronic device may perform AWB on image data based on both the first AWB parameter and the second AWB parameter.

In an embodiment, the electronic device 100 may divide the acquired image data into a first region and a second region within one frame under the control of the processor 105. For example, the electronic device 100 may acquire a first AWB parameter for a first region, and a second AWB parameter for a second region under the control of the processor 105. The electronic device 100 may perform AWB using the first AWB parameter on the first region, and may perform AWB using the second AWB parameter on the second region under the control of the processor 105. The electronic device 100 may perform (or apply) AWB for each region (e.g., AWB using the first AWB parameter on the first region and AWB using the second AWB parameter on the second region) under the control of the processor 105, and thus may generate a result image. For another example, the electronic device 100 may divide the image data into a first region frame and a second region frame under the control of the processor 105. Here, the electronic device 100 may perform AWB using the first AWB parameter on the first region frame and perform AWB using the second AWB parameter on the second region frame under the control of the processor 105, and thus may generate a result image.

Figure 4:
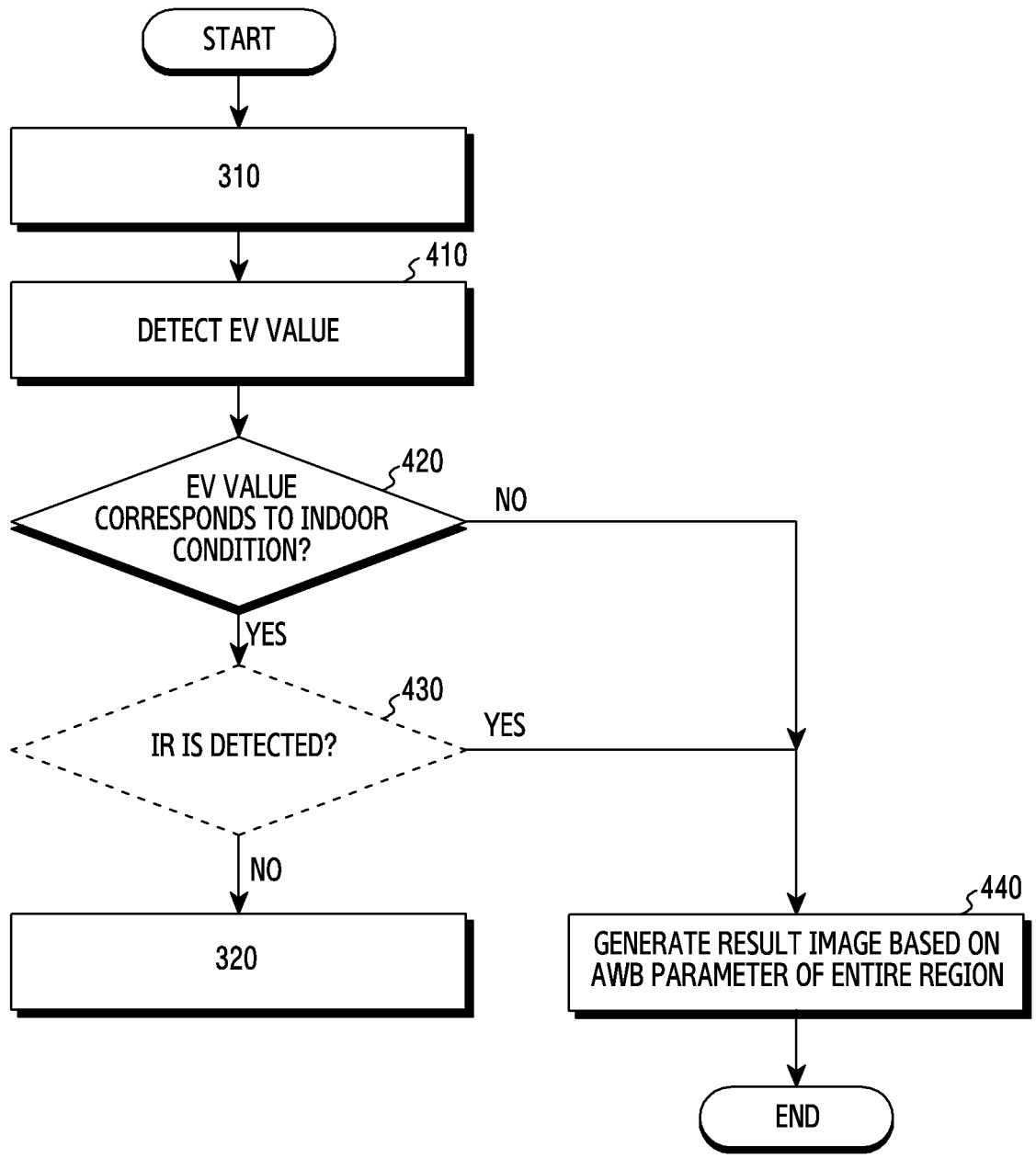
FIG. 4 is a flowchart illustrating determination of an indoor condition by an electronic device according to an embodiment.

FIG. 4 is a flowchart illustrating determination of an indoor condition by an electronic device according to an embodiment. In particular, FIG. 4 illustrates optional steps occurring between steps 310 and 320 of FIG. 3.

According to an embodiment, after the electronic device acquires image data through a camera in operation 310, the electronic device may detect an exposure value (EV) for determining an indoor condition in operation 410. For example, the electronic device 100 may acquire image data of a light source or a subject through the camera 101 under the control of the processor 105. The electronic device 100 may detect an EV value from the light source or the subject while acquiring image data through the camera 101 under the control of the processor 105.

According to an embodiment, in operation 420, the electronic device may determine whether the EV value corresponds to an indoor condition (e.g., an indoor lighting condition). For example, in a case where both an outdoor light source and an indoor light source exist under the control of the processor 105, if the EV value in the first range is detected, the electronic device 100 may determine that it is not an indoor condition. The electronic device 100 may perform operation 440 when it is determined that the indoor condition does not exist, under the control of the processor 105. For another example, in a case where both an outdoor light source and an indoor light source exist under the control of the processor 105, if an EV value in the second range is detected, the electronic device 100 may determine that it corresponds to the indoor condition.

According to an embodiment, in operation 430, the electronic device may determine whether infrared (IR) light (or IR data) is detected and whether the detected amount of IR light is less than a designated threshold value under the control of the processor 105. For example, image data acquired based on an indoor light source may not include IR data or may include IR data under a threshold value, and image data acquired based on an outdoor light source may include IR data equal to or above the threshold value. When the light source includes IR, the electronic device may detect IR data from the image data acquired under the control of the processor 105. For example, when the electronic device 100 detects IR data from the image data, the electronic device 100 may determine that the image data acquired under the control of the processor 105 does not correspond to an indoor condition. The electronic device 100 may perform operation 440 when IR data is detected under the control of the processor 105. For another example, when the electronic device 100 fails to detect IR data from the image data, the electronic device 100 may determine that the image data acquired under the control of the processor 105 corresponds to an indoor condition.

Alternatively, if IR data is not detected in operation 430, then the electronic device may proceed to executing step 320 of FIG. 3, thereby initiating partition of the image into a first region(s) and a second region.

According to an embodiment, operation 430 may not be a required operation. For example, when the electronic device 100 determines whether the detected EV value corresponds to an indoor condition in operation 420, the electronic device 100 may omit operation 430 under the control of the processor 105. In another example, the electronic device 100 may be preconfigured to omit operation 430 in advance, in order to shorten the processing time.

According to an embodiment, in operation 440, the electronic device may generate a result image based on the AWB parameter of the entire region under the control of the processor 105. For example, the electronic device 100 may determine that the EV value does not correspond to an indoor condition in operation 420, or may detect IR data in operation 430. Here, since the EV value does not correspond to an indoor condition, the electronic device 100 may not be required to obtain an AWB parameter (e.g., a first AWB parameter, a second AWB parameter) for each of a plurality of regions of image data depending on the complex light source. The electronic device 100 may acquire AWB parameter of the entire region from acquired image data under the control of the processor 105. In addition, the electronic device 100 may perform AWB on the entire region based on the AWB parameter of the entire region under the control of the processor 105, and thus may generate a result image.

Figure 5:
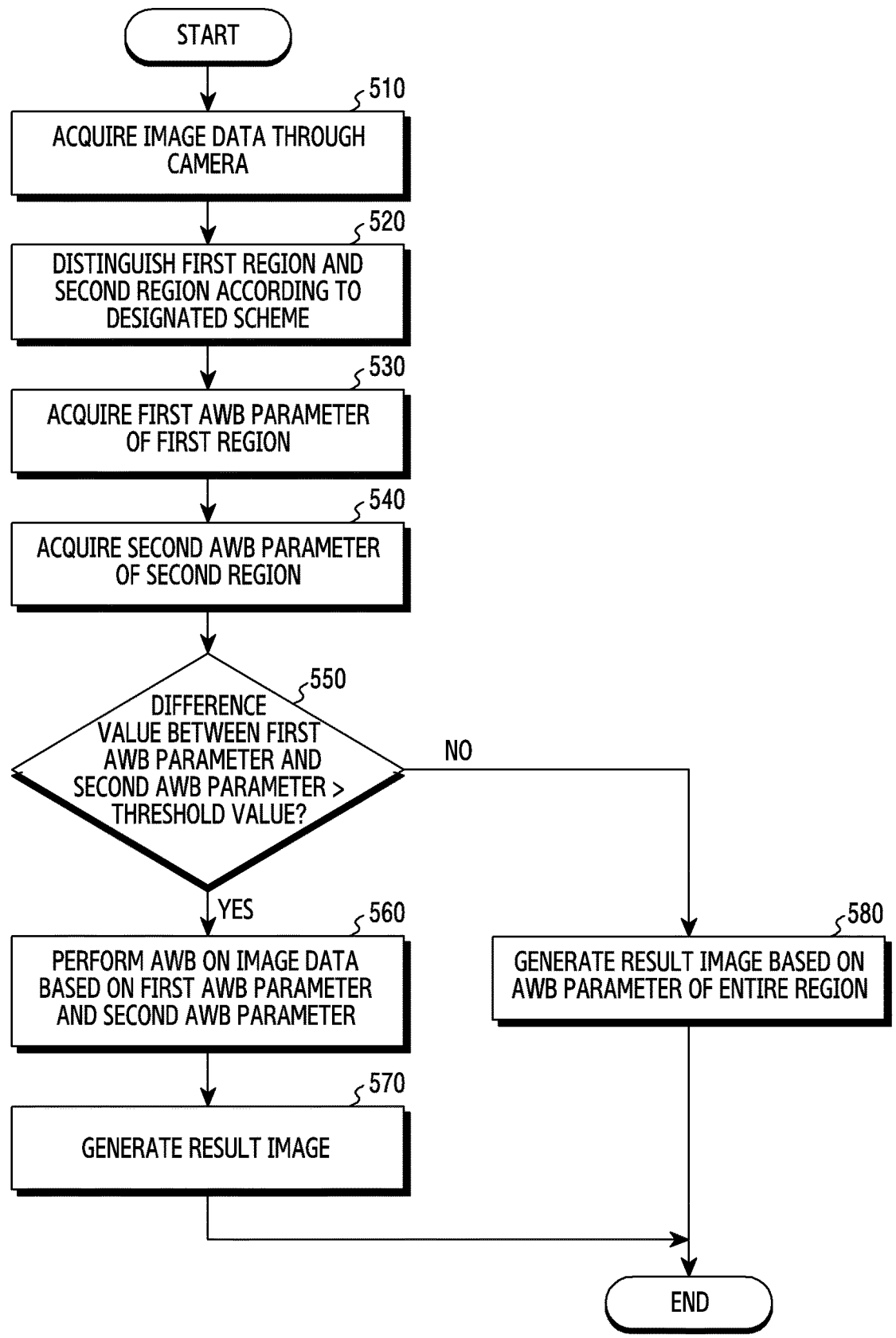
FIG. 5 is flowchart illustrating in detail the application of AWB to a plurality of regions by an electronic device according to an embodiment.

FIG. 5 is a flowchart illustrating in detail the application of AWB to a plurality of regions by an electronic device according to an embodiment.

According to an embodiment, in operation 510, the electronic device may acquire image data through a camera. For example, the electronic device 100 may acquire image data including RGB data, color temperature data, and IR data through the camera 101 under the control of the processor 105.

According to an embodiment, in operation 520, the electronic device may partition the acquired image data into a first region and a second region according to a designated scheme (e.g., machine learning-based image segmentation or region setting based on the distance detection sensor 102) under the control of the processor 105.

In an embodiment, operation 520 may be the same as or similar to operation 320 described with reference to FIG. 3. For example, the electronic device 100 may partition the acquired image data into a first region and a second region in one frame according to a designated scheme (e.g., machine learning-based image segmentation or region setting based on the distance detection sensor 102) under the control of the processor 105. For another example, the electronic device 100 may partition the acquired image data into a first region frame and a second region frame according to a designated scheme (e.g., machine learning-based image segmentation or region setting based on the distance detection sensor 102) under the control of the processor 105.

According to an embodiment, between operations 510 and 520 (e.g., as in FIG. 4), the electronic device may determine that the EV value or IR data detected under the control of the processor 105 corresponds to an indoor condition. For example, the electronic device 100 may acquire image data through operation 510, and may determine that the image data corresponds to an indoor condition through operations 410 to 430 and then perform operation 520 under the control of the processor 105.

According to an embodiment, in operation 530, the electronic device may acquire a first AWB parameter of the first region under the control of the processor 105. Operation 530 may be the same as or similar to operation 330 described with reference to FIG. 3.

According to an embodiment, in operation 540, the electronic device may acquire a second AWB parameter of the second region under the control of the processor 105. Operation 540 may be the same as or similar to operation 340 described with reference to FIG. 3.

According to an embodiment, in operation 550, the electronic device may determine whether a difference value between the first AWB parameter and the second AWB parameter is greater than or equal to a threshold value under the control of the processor 105.

In an embodiment, the AWB parameters (e.g., the first AWB parameter and the second AWB parameter) acquired by the electronic device 100 in a complex light source environment under the control of the processor 105 may be significantly different from that of a single light source environment. For example, in a case of a single light source (e.g., an indoor light source), there is a little or no difference in value between the first AWB parameter of the first region and the second AWB parameter of the second region. The electronic device 100 may configure a threshold value used for a determination criterion for applying the AWB to each region according to a complex light source under the control of the processor 105.

In an embodiment, when it is determined that a difference value between the first AWB parameter and the second AWB parameter is greater than or equal to a threshold value under the control of the processor 105, the electronic device 100 may perform operation 560 in order to apply a region-specific AWB parameter (e.g., the first AWB parameter and the second AWB parameter) to the acquired image data.

In an embodiment, when it is determined that the difference value between the first AWB parameter and the second AWB parameter is not greater than or equal to the threshold value under the control of the processor 105, the electronic device 100 may apply the AWB parameter of the entire region to the acquired image data in operation 580. The electronic device 100 may perform AWB on the entire region of the acquired image data by applying the AWB parameter of the entire region thereto under the control of the processor 105, and thus may generate a result image.

According to an embodiment, in operation 560, the electronic device may perform AWB on image data based on both the first AWB parameter and the second AWB parameter under the control of the processor 105. For example, the electronic device 100 may apply the first AWB parameter obtained in operation 530 to a first region in one frame, and may apply the second AWB parameter obtained in operation 540 to a second region in one frame under the control of the processor 105. For another example, the electronic device 100 may apply the first AWB parameter obtained in operation 530 to a first region frame, and may apply the second AWB parameter obtained in operation 540 to a second region frame under the control of the processor 105.

According to an embodiment, in operation 570, the electronic device may generate a result image under the control of the processor 105.

In an embodiment, the electronic device 100 may generate a result image by performing AWB on each of the first region and the second region in one frame under the control of the processor 105.

In another embodiment, the electronic device 100 may generate a result image by synthesizing multiple frames (e.g., a first region frame and a second region frame) for which first AWB parameter-based AWB is performed on the first region frame and second AWB parameter-based AWB is performed on the second region frame under the control of the processor 105.

According to an embodiment, in operation 580 (as noted above), the electronic device may generate a result image based on the AWB parameter of the entire region under the control of the processor 105. For example, when a difference value between the first AWB parameter and the second AWB parameter is less than a threshold value in operation 550, the electronic device 100 may apply the AWB parameter of the entire region thereto under the control of the processor 105. The electronic device 100 may generate a result image by applying the AWB parameter of the entire region thereto under the control of the processor 105.

Figure 6:
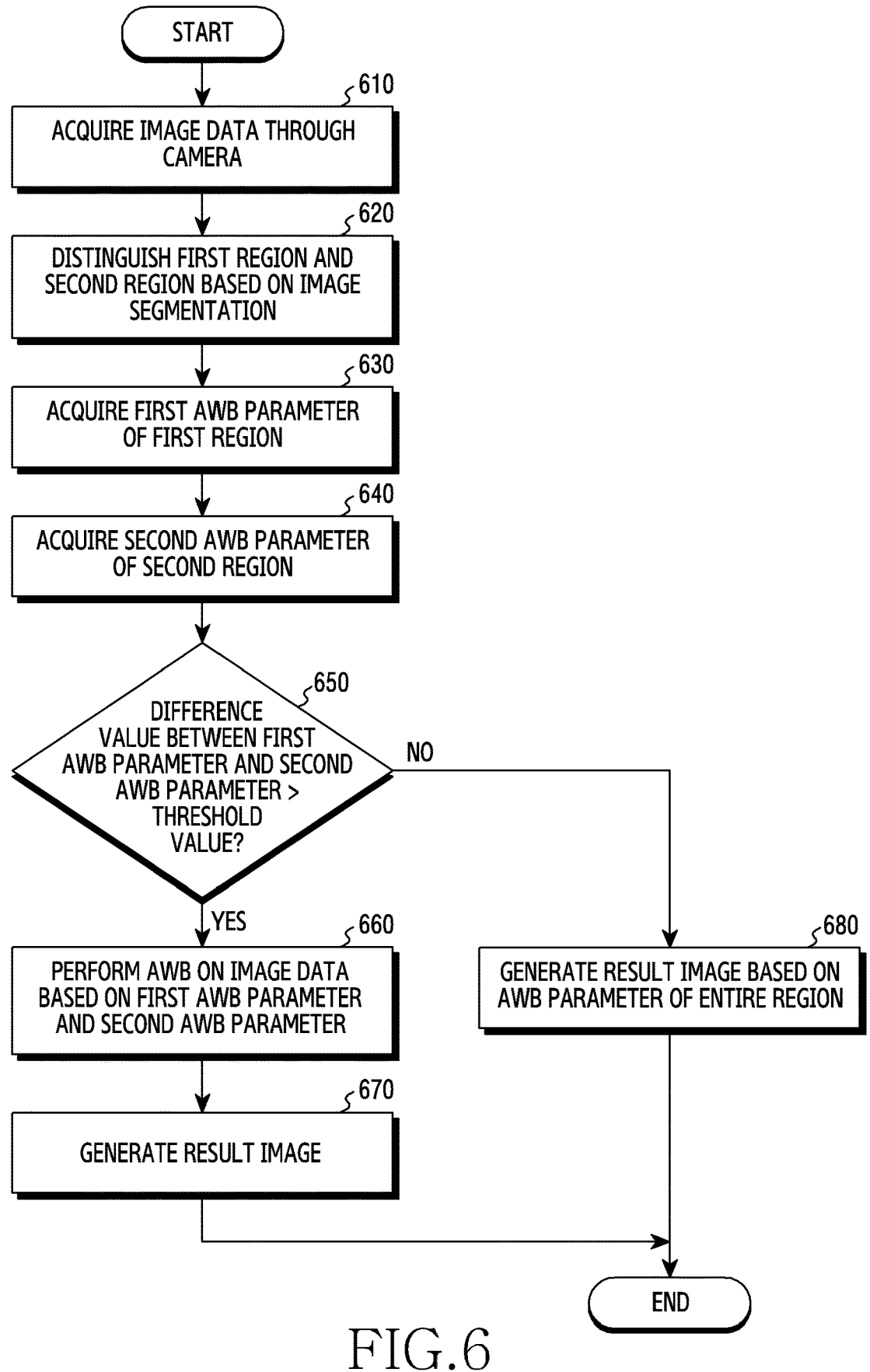
FIG. 6 is a flowchart illustrating performance of AWB on a plurality of regions, by an electronic device, based on image segmentation according to an embodiment.

FIG. 6 is a flowchart illustrating performance of AWB on a plurality of regions based on image segmentation by an electronic device according to an embodiment. Operations (e.g., operations 610 to 680) of the electronic device according to an embodiment will be described with reference to FIG. 7, which illustrates a plurality of regions on which an electronic device performs AWB based on image segmentation.

According to an embodiment, in operation 610, the electronic device may acquire image data through a camera. For example, the electronic device 100 may acquire image data 700 acquired in a complex light source environment under the control of the processor 105. The image data 700 may include RGB data (e.g., RGB ratio data), color temperature data, and IR data for a complex light source environment.

According to an embodiment, in operation 620, the electronic device may partition the acquired image data into the first region and the second region based on image segmentation.

In an embodiment, the electronic device 100 may perform machine learning-based image segmentation under the control of the processor 105. The electronic device 100 may distinguish a first region 710 and a second region 720 by performing machine learning relating to image segmentation, RGB ratio data, and a threshold value based on a relationship between a ratio of R and a ratio of B, which will be described later, under the control of the processor 105.

In an embodiment, the electronic device 100 may acquire the ratios of R, G, and B by detecting RGB ratio data of the image data 700 under the control of the processor 105. The RGB ratio of image data acquired in an indoor light source environment may be different from the RGB ratio of image data acquired in an environment where both an indoor light source and an outdoor light source exist. For example, the ratio of B in relation to the RGB ratio of image data acquired in an environment where an outdoor light source and an indoor light source exist together may be larger than the RGB ratio of image data acquired in an indoor light source environment.

In an embodiment, the electronic device 100 may configure a threshold value based on a relationship between the ratio of R and the ratio of B in relation to the RGB ratios of the image data 700 based on machine learning under the control of the processor 105. For example, the electronic device 100 may configure a threshold value such that AWB is performed using different parameters when the R/B is 0.6 under the control of the processor 105. For another example, the electronic device 100 may perform AWB at a higher ratio when the R/B is 0.6 or less, and may perform AWB at a relatively lower ratio when the R/B exceeds 0.6 under the control of the processor 105.

Figure 7:
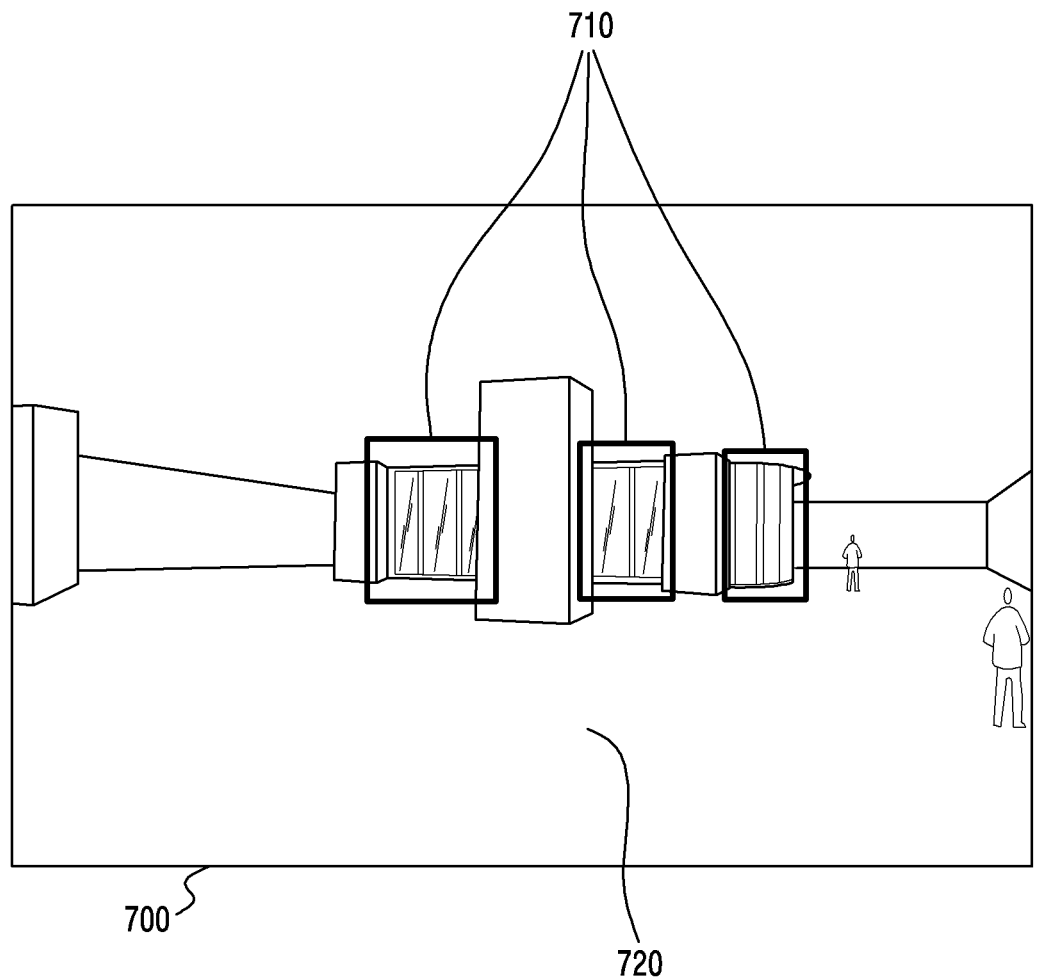
FIG. 7 illustrates a plurality of regions on which an electronic device performs AWB based on image segmentation according to an embodiment.

In an embodiment, referring to FIG. 7, the electronic device 100 may acquire RGB ratio data from the image data 700 under the control of the processor 105. In addition, the electronic device 100 may distinguish regions (e.g., a first region 710 and a second region 720) based on a threshold value (e.g., R/B is 0.6) configured based on the relationship between the ratio of R and the ratio of B in relation to the RGB ratios under the control of the processor 105. For example, the electronic device 100 may distinguish, as a first region, a region in which a window, having an R/B value of less than 0.6 due to the influence of an outdoor light source, exists, and may distinguish, as a second region, a region in which a window, having an R/B value of 0.6 or more that is not affected much by the outdoor light source, does not exist under the control of the processor 105.

According to an embodiment, in operation 630, the electronic device may acquire the first AWB parameter of the first region under the control of the processor 105. For example, the electronic device 100 may acquire a first AWB parameter for performing AWB on the first region 710, which is a region in which a physical window is found within the image, resulting in a large incidence of outdoor light, under the control of the processor 105. The first region 710 may have a higher ratio of B in relation to RGB ratio data due to a large influence of the outdoor light source due to the presence of the window. The electronic device 100 may acquire the first AWB parameter for lowering the ratio of B in relation to the RGB ratio data under the control of the processor 105.

According to an embodiment, in operation 640, the electronic device may acquire the second AWB parameter of the second region. For example, the electronic device 100 may acquire a second AWB parameter for performing AWB on the second region 720, which is a region in which no window is disposed, resulting in more intensity of indoor lighting, under the control of the processor 105. In the second region 720, the ratio of B may be lower than that of the first region 710 in relation to the RGB ratio data because the second region does not have a window and is not affected much by the outdoor light source. The electronic device 100 may acquire the second AWB parameter for adjusting the ratio of B in relation to the RGB ratio data under the control of the processor 105.

According to an embodiment, in operation 650, the electronic device may determine whether a difference value between the first AWB parameter and the second AWB parameter is greater than or equal to a threshold value.

In an embodiment, the electronic device 100 may calculate a difference value between the first AWB parameter of the first region 710 and the second AWB parameter of the second region 720, obtained under the control of the processor 105. When the difference value is greater than or equal to the threshold value, the electronic device 100 may perform operation 660 in order to perform AWB for adjusting the ratio of B due to the complex light source under the control of the processor 105. In addition, when a difference value between the acquired first AWB parameter and second AWB parameter is less than a threshold value, the electronic device 100 may perform operation 680 under the control of the processor 105.

According to an embodiment, in operation 660, the electronic device may perform AWB on image data based on the first AWB parameter and the second AWB parameter.

In an embodiment, the electronic device 100 may perform AWB by applying the first AWB parameter to the first region 710 of the image data 700, and may perform AWB by applying the second AWB parameter to the second region 720 of the image data 700 under the control of the processor 105.

In another embodiment, the electronic device 100 may perform AWB by applying the first AWB parameter to a first region frame including the first region 710 of the image data 700 under the control of the processor 105. In addition, the electronic device 100 may perform AWB by applying the second AWB parameter to a second region frame including the second region 720 of the image data 700 under the control of the processor 105.

According to an embodiment, in operation 670, the electronic device may generate a result image.

In an embodiment, the electronic device 100 may generate a result image obtained by performing AWB on first and second regions, that is, by applying the first AWB parameter to the first region 710 in which the window exists and applying the second AWB parameter to the second region 720 in which the window does not exist under the control of the processor 105.

In another embodiment, the electronic device 100 may generate a result image obtained by performing AWB on first and second region frames, that is, by applying the first AWB parameter to a first region frame including the first region 710 in which the window exists and applying the second AWB parameter to a second region frame including the second region 720 in which the window does not exist under the control of the processor 105.

According to an embodiment, in operation 680, the electronic device may generate a result image based on the AWB parameter of the entire region. For example, when a difference value between the first AWB parameter and the second AWB parameter is less than the threshold value in operation 660, then, under the control of the processor 105, the electronic device 100 may not perform AWB for each region according to a complex light source. Here, the electronic device 100 may acquire the AWB parameter of the entire region of the image data 700, may perform AWB on the image data 700 based on the AWB parameter of the entire region, and may generate a result image according to performance of AWB under the control of the processor 105.

Figure 8:
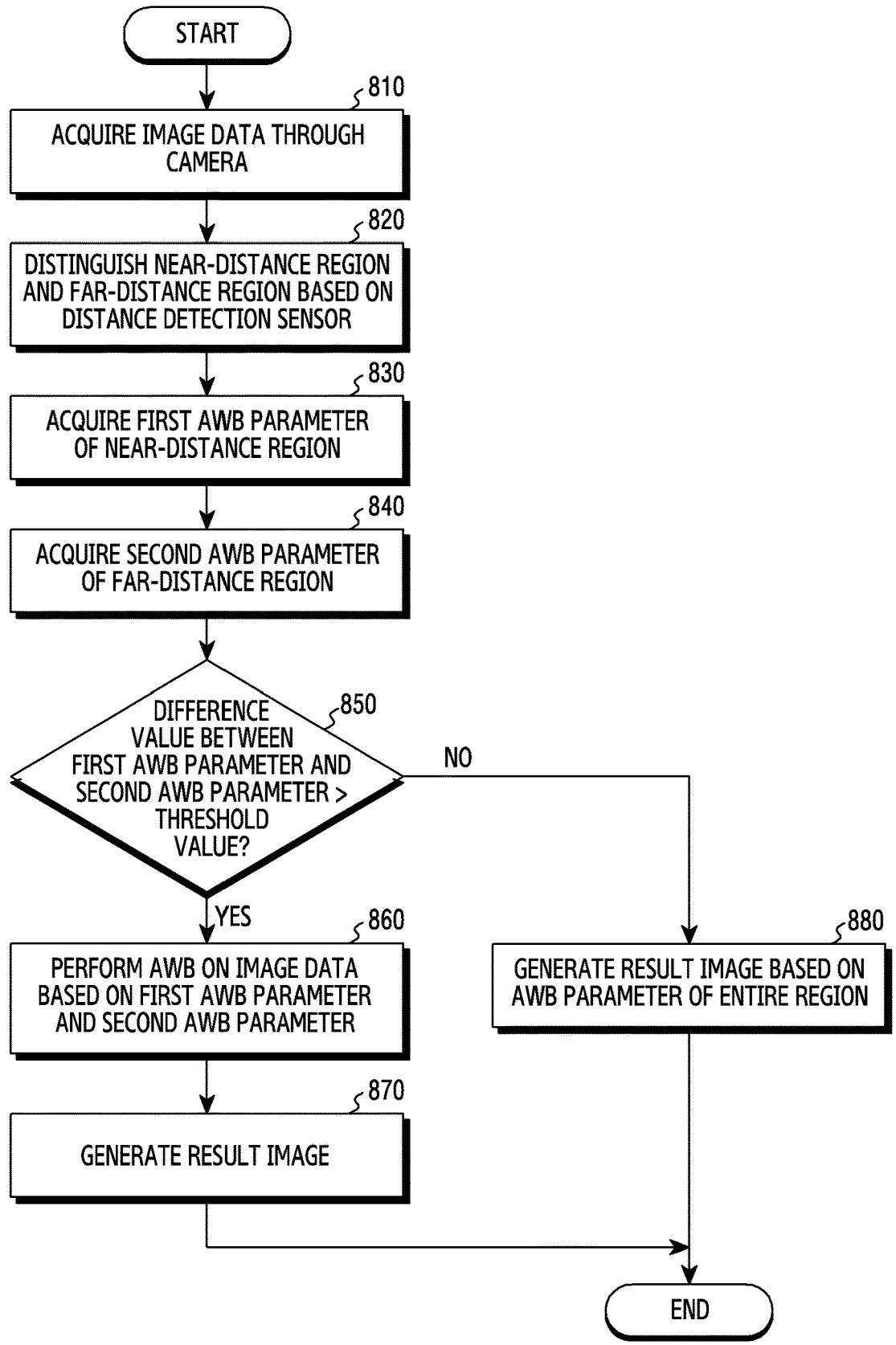
FIG. 8 is a flowchart illustrating performance of AWB on a plurality of regions, by an electronic device, based on a distance detection sensor, according to an embodiment.
Figure 9:
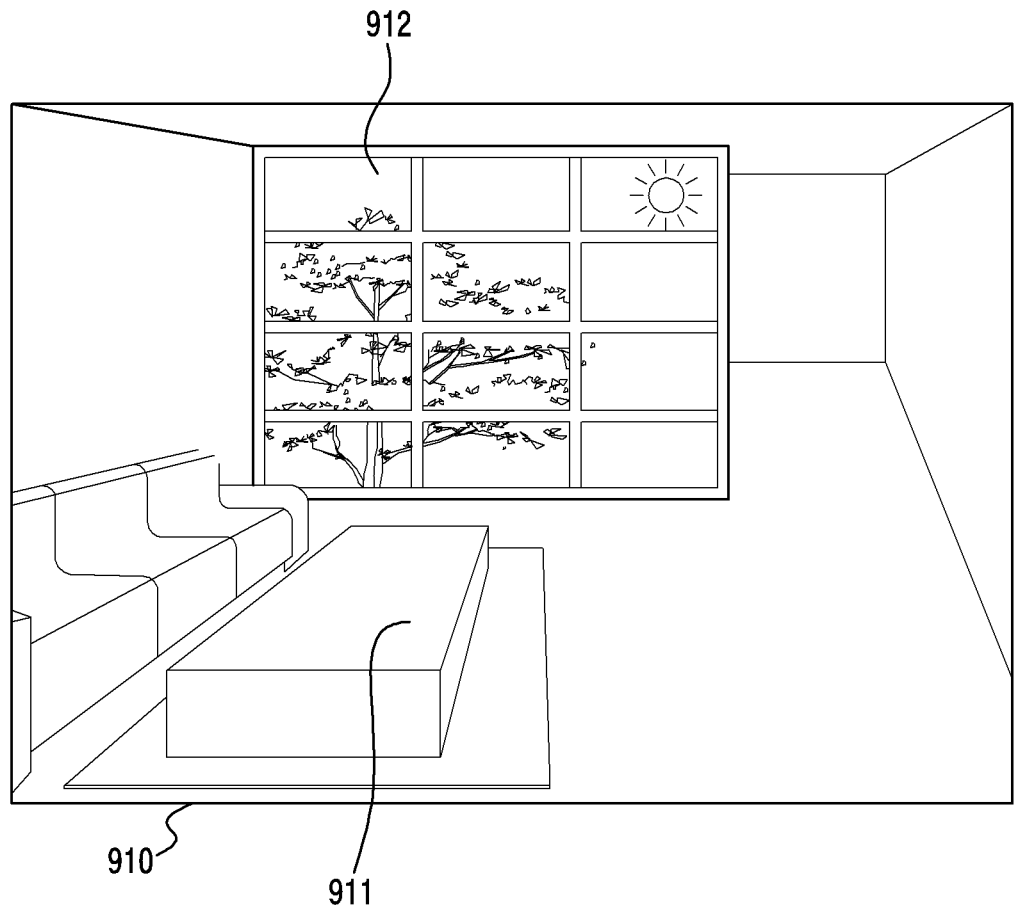
FIG. 9 illustrates a plurality of regions on which an electronic device performs AWB based on a distance detection sensor according to an embodiment.

FIG. 8 is a flowchart illustrating performance of AWB on a plurality of regions, by an electronic device, based on a distance detection sensor, according to an embodiment. Operations (e.g., operations 810 to 880) of the electronic device according to an embodiment will be described with reference to FIG. 9, which illustrates a plurality of regions on which the electronic device performs AWB based on a distance detection sensor.

According to an embodiment, in operation 810, the electronic device may acquire image data through a camera. For example, the electronic device 100 may acquire image data 910, which captures an image of an environment having a complex lighting from multiple sources, under the control of the processor 105.

According to an embodiment, in operation 820, the electronic device may distinguish between a near-distance region and a far-distance region within the acquired image data, based on a distance detection sensor. For example, the electronic device 100 may distinguish, as a near-distance region 911, a region of the image data 910 in which the distance value between the depicted area and the camera/device is less than a threshold value, by using the distance detection sensor 102 under the control of the processor 105. In addition, the electronic device 100 may distinguish, as a far-distance region 912, a region of the image data 910 in which the distance value between the detected area and the camera/device is greater than or equal to the threshold value, using the distance detection sensor 102 under the control of the processor 105. For another example, the electronic device 100 may distinguish, as a near-distance frame, a region including the near-distance region 911 and distinguish, as a far distance frame, a region including the far-distance region 912, by using the distance detection sensor 102 under the control of the processor 105.

According to an embodiment, in operation 830, the electronic device may acquire the first AWB parameter of the near-distance region. For example, the near-distance region 911 may be a region that does not include a physical window, and includes incidence of indoor lighting. The electronic device 100 may acquire a first AWB parameter for performing AWB for a region that does not include a window under the control of the processor 105.

According to an embodiment, in operation 840, the electronic device may acquire a second AWB parameter of the far-distance region. For example, the far-distance region 912 may be a region in which a physical window exists, with incidence of outdoor lighting. The electronic device 100 may acquire the second AWB parameter for performing AWB on the region including the window under the control of the processor 105.

According to an embodiment, in operation 850, the electronic device may determine whether a difference value between the first AWB parameter and the second AWB parameter is greater than or equal to a threshold value.

In an embodiment, the electronic device 100 may calculate a difference value between the first AWB parameter for the near-distance region 911 and the second AWB parameter for the far-distance region 912 under the control of the processor 105. For example, in the near-distance region 911, the ratio of "B" may not be high in relation to the RGB ratio data because the near distance region does not have a window and thus is not affected much by an outdoor light source. The electronic device 100 may acquire the first AWB parameter for adjusting the ratio of B in relation to the RGB ratio data under the control of the processor 105. For another example, since a window exists in the far-distance region 912, the ratio of B in relation to the RGB ratio data may be high due to a large influence of an outdoor light source. Here, the electronic device 100 may acquire the second AWB parameter for lowering the ratio of B under the control of the processor 105.

In an embodiment, the electronic device 100 may determine whether a difference value between the first AWB parameter for the near-distance region 911 and the second AWB parameter for the far-distance region 912 is greater than or equal to a threshold value under the control of the processor 105. For example, when the difference value is greater than or equal to a threshold value, the electronic device 100 may perform operation 860, in order to perform AWB for adjusting the ratio of B due to the complex light source, under the control of the processor 105. In addition, the electronic device 100 may perform operation 880 when a difference value between the first AWB parameter and the second AWB parameter acquired is less than a threshold value under the control of the processor 105.

According to an embodiment, in operation 860, the electronic device may perform AWB on image data based on the first AWB parameter and the second AWB parameter.

In an embodiment, the electronic device 100 may perform AWB by applying the first AWB parameter to the near-distance region 911 of the image data 910, and may perform AWB by applying the second AWB parameter to the far-distance region 912 of the image data 910 under the control of the processor 105.

In another embodiment, the electronic device 100 may perform AWB by applying the first AWB parameter to a near distance region frame including the near distance region 911 of the image data 910 under the control of the processor 105. In addition, the electronic device 100 may perform AWB by applying the second AWB parameter to the far-distance region frame including the far-distance region 912 of the image data 910 under the control of the processor 105.

According to an embodiment, in operation 870, the electronic device may generate a result image.

In an embodiment, the electronic device 100 may apply the first AWB parameter to the near-distance region 911 where the window does not exist, and apply the second AWB parameter to the far-distance region 912 where the window exists to perform AWB under the control of the processor 105, and thus may generate a result image.

In another embodiment, the electronic device 100 may apply the first AWB parameter to a near-distance region frame including the near-distance region 911 where the window does not exist and apply the second AWB parameter to a far-distance region frame including the far-distance region 912 where the window exists to perform AWB under the control of the processor 105, and thus may generate a result image.

According to an embodiment, in operation 880, the electronic device may generate a result image based on the AWB parameter of the entire region.

For example, when a difference value between the first AWB parameter and the second AWB parameter is less than a threshold value in operation 850 under the control of the processor 105, the electronic device 100 may not need to perform AWB for each region according to a complex light source. Here, the electronic device 100 may acquire the AWB parameter of the entire region of the image data 910 under the control of the processor 105, may perform AWB on the image data 910 based on the AWB parameter of the entire region, and may generate a result image according to the performance of AWB, under the control of the processor 105.

Figure 10:
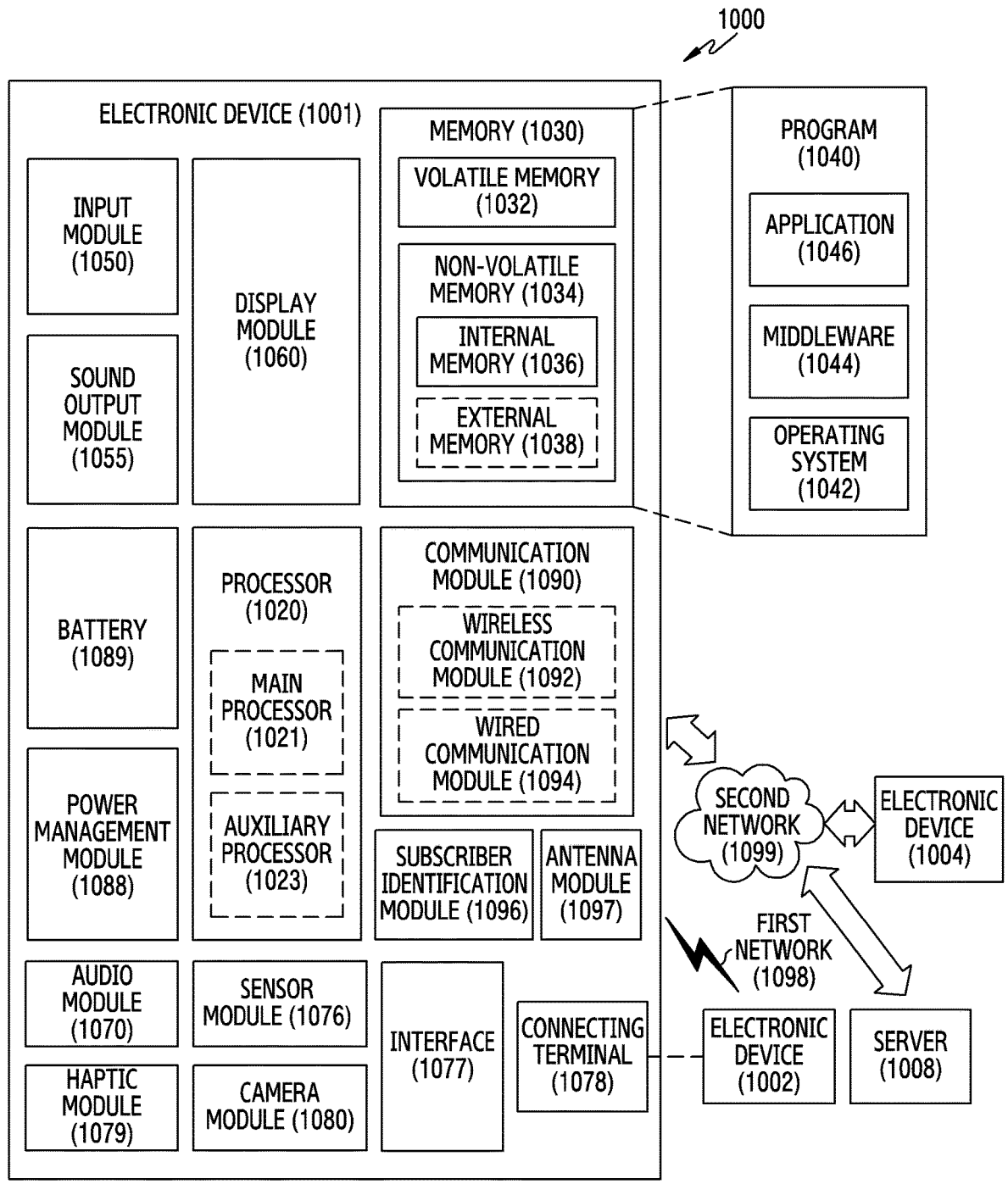
FIG. 10 is a block diagram of an electronic device in a network environment according to certain embodiments.

FIG. 10 is a block diagram illustrating an electronic device 1001 in a network environment 1000 according to certain embodiments.

Referring to FIG. 10, the electronic device 1001 in the network environment 1000 may communicate with an electronic device 1002 via a first network 1098 (e.g., a short-range wireless communication network), or an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module (SIM) 1096, or an antenna module 1097. In some embodiments, at least one (e.g., the display device 1060 or the camera module 1080) of the components may be omitted from the electronic device 1001, or one or more other components may be added in the electronic device 1001. In some embodiments, some of the components may be implemented as single integrated circuitry. For example, the sensor module 1076 (e.g., a fingerprint sensor, an iris sensor, or an illuminance sensor) may be implemented as embedded in the display device 1060 (e.g., a display).

The processor 1020 may execute, for example, software (e.g., a program 1040) to control at least one other component (e.g., a hardware or software component) of the electronic device 1001 coupled with the processor 1020, and may perform various data processing or computation. According to an embodiment, as at least part of the data processing or computation, the processor 1020 may load a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), and an auxiliary processor 1023 (e.g., a graphics processing unit (GPU), an image signal processor (ISP), a sensor hub processor, or a communication processor (CP)) that is operable independently from, or in conjunction with, the main processor 1021. Additionally or alternatively, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display device 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023.

The memory 1030 may store various data used by at least one component (e.g., the processor 1020 or the sensor module 1076) of the electronic device 1001. The various data may include, for example, software (e.g., the program 1040) and input data or output data for a command related thererto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input device 1050 may receive a command or data to be used by other component (e.g., the processor 1020) of the electronic device 1001, from the outside (e.g., a user) of the electronic device 1001. The input device 1050 may include, for example, a microphone, a mouse, a keyboard, or a digital pen (e.g., a stylus pen).

The sound output device 1055 may output sound signals to the outside of the electronic device 1001. The sound output device 1055 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1060 may visually provide information to the outside (e.g., a user) of the electronic device 1001. The display device 1060 may include, for example, a display, a hologram device, or a projector and control circuitry to control a corresponding one of the display, hologram device, and projector. According to an embodiment, the display device 1060 may include touch circuitry adapted to detect a touch, or sensor circuitry (e.g., a pressure sensor) adapted to measure the intensity of force incurred by the touch.

The audio module 1070 may convert a sound into an electrical signal and vice versa. According to an embodiment, the audio module 1070 may obtain the sound via the input device 1050, or output the sound via the sound output device 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to an embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The antenna module 1097 may transmit or receive a signal or power to or from the outside (e.g., the external electronic device) of the electronic device 1001. According to an embodiment, the antenna module 1097 may include an antenna including a radiating element composed of a conductive material or a conductive pattern formed in or on a substrate (e.g., PCB). According to an embodiment, the antenna module 1097 may include a plurality of antennas. In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 and 1004 may be a device of a same type as, or a different type, from the electronic device 1001. According to an embodiment, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, or client-server computing technology may be used, for example.

Figure 11:
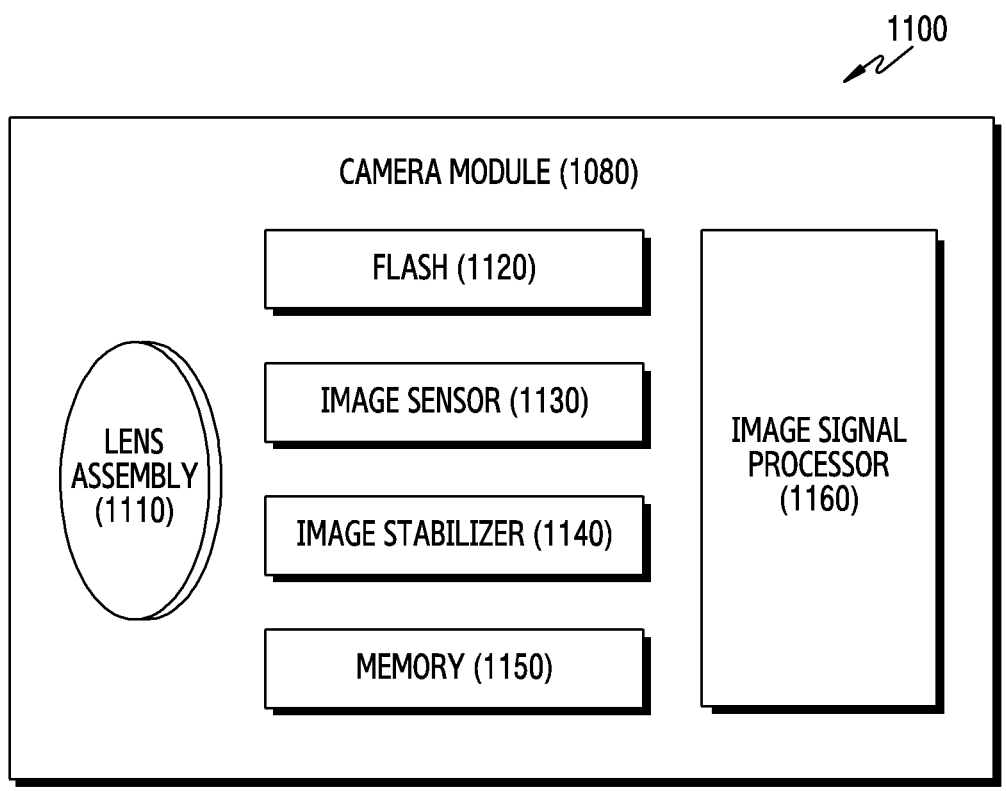
FIG. 11 is a block diagram illustrating a camera module according to certain embodiments.

FIG. 11 is a block diagram 1100 illustrating the camera module 1080 according to certain embodiments. Referring to FIG. 11, the camera module 1080 may include a lens assembly 1110, a flash 1120, an image sensor 1130, an image stabilizer 1140, memory 1150 (e.g., buffer memory), or an image signal processor 1160. The lens assembly 1110 may collect light emitted or reflected from an object whose image is to be taken. The lens assembly 1110 may include one or more lenses. According to an embodiment, the camera module 1080 may include a plurality of lens assemblies 1110. In such a case, the camera module 1080 may form, for example, a dual camera, a 360-degree camera, or a spherical camera. Some of the plurality of lens assemblies 1110 may have the same lens attribute (e.g., view angle, focal length, auto-focusing, f number, or optical zoom), or at least one lens assembly may have one or more lens attributes different from those of another lens assembly. The lens assembly 1110 may include, for example, a wide-angle lens or a telephoto lens.

The flash 1120 may emit light that is used to reinforce light reflected from an object. According to an embodiment, the flash 1120 may include one or more light emitting diodes (LEDs) (e.g., a red-green-blue (RGB) LED, a white LED, an infrared (IR) LED, or an ultraviolet (UV) LED) or a xenon lamp. The image sensor 1130 may obtain an image corresponding to an object by converting light emitted or reflected from the object and transmitted via the lens assembly 1110 into an electrical signal. According to an embodiment, the image sensor 1130 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 1130 may be implemented using, for example, a charged coupled device (CCD) sensor or a complementary metal oxide semiconductor (CMOS) sensor.

The image stabilizer 1140 may move the image sensor 1130 or at least one lens included in the lens assembly 1110 in a particular direction, or control an operational attribute (e.g., adjust the read-out timing) of the image sensor 1130 in response to the movement of the camera module 1080 or the electronic device 1001 including the camera module 1080. This allows compensating for at least part of a negative effect (e.g., image blurring) by the movement on an image being captured. According to an embodiment, the image stabilizer 1140 may sense such a movement by the camera module 1080 or the electronic device 1001 using a gyro sensor (not shown) or an acceleration sensor (not shown) disposed inside or outside the camera module 1080. According to an embodiment, the image stabilizer 1140 may be implemented, for example, as an optical image stabilizer.

The memory 1150 may store, at least temporarily, at least part of an image obtained via the image sensor 1130 for a subsequent image processing task. For example, if image capturing is delayed due to shutter lag or multiple images are quickly captured, a raw image obtained (e.g., a Bayer-patterned image, a high-resolution image) may be stored in the memory 1150, and its corresponding copy image (e.g., a low-resolution image) may be previewed via the display device 1060. Thereafter, if a specified condition is met (e.g., by a user's input or system command), at least part of the raw image stored in the memory 1150 may be obtained and processed, for example, by the image signal processor 1160. According to an embodiment, the memory 1150 may be configured as at least part of the memory 1030 or as a separate memory that is operated independently from the memory 1030.

The image signal processor 1160 may perform one or more image processing with respect to an image obtained via the image sensor 1130 or an image stored in the memory 1150. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 1160 may perform control (e.g., exposure time control or read-out timing control) with respect to at least one (e.g., the image sensor 1130) of the components included in the camera module 1080. An image processed by the image signal processor 1160 may be stored back in the memory 1150 for further processing, or may be provided to an external component (e.g., the memory 1030, the display device 1060, the electronic device 1002, the electronic device 1004, or the server 1008) outside the camera module 1080. According to an embodiment, the image signal processor 1160 may be configured as at least part of the processor 1020, or as a separate processor that is operated independently from the processor 1020. If the image signal processor 1160 is configured as a separate processor from the processor 1020, at least one image processed by the image signal processor 1160 may be displayed, by the processor 1020, via the display device 1060 as it is or after being further processed.

According to an embodiment, the electronic device 1001 may include a plurality of camera modules 1080 having different attributes or functions. In such a case, at least one of the plurality of camera modules 1080 may form, for example, a wide-angle camera and at least another of the plurality of camera modules 1080 may form a telephoto camera. Similarly, at least one of the plurality of camera modules 1080 may form, for example, a front camera and at least another of the plurality of camera modules 1080 may form a rear camera.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
   a camera;
   at least one processor; and
   a memory storing instructions being executable by the at least one processor, causing the electronic device to at least;
   acquire image by using the camera;
   partition the acquired image into a first region and a second region according to a designated scheme;
   acquire a first auto-white-balancing (AWB) parameter of the first region, and a second AWB parameter of the second region; and
   when a difference value between the first AWB parameter and the second AWB parameter is greater than a first threshold value, execute AWB on the acquired image by using both the first AWB parameter and the second AWB parameter,
   when the difference value between the first AWB parameter and the second AWB parameter is less than or equal to the first threshold value, acquire a third AWB parameter of the acquired image and execute the AWB on the acquired image by using the third AWB parameter.

2. The electronic device of claim 1, wherein the designated scheme includes partitioning the acquired image into the first region and the second region by using image segmentation based on machine learning.

3. The electronic device of claim 2, wherein the instructions being executable by the at least one processor, further causes the electronic device to perform the machine learning based on at least one of red-green-blue (RGB) ratio data and a second threshold value.

4. The electronic device of claim 2, wherein the instructions being executable by the at least one processor, further causes the electronic device to, when the difference value between the first AWB parameter and the second AWB parameter is greater than the first threshold value, execute the AWB on the acquired image by applying the first AWB parameter to the first region, and by applying the second AWB parameter to the second region.

5. The electronic device of claim 1, wherein the designated scheme includes setting a first region frame and a second region frame within an area of the acquired image by using image segmentation based on machine learning.

6. The electronic device of claim 5, wherein the instructions being executable by the at least one processor, further causes the electronic device to, when the difference value between the first AWB parameter and the second AWB parameter is greater than the first threshold value, execute the AWB on the acquired image by applying the first AWB parameter to the first region frame, and by applying the second AWB parameter to the second region frame.

7. The electronic device of claim 1, further comprising a distance detection sensor,
   wherein the designated scheme includes partitioning the acquired image into the first region and the second region by using the distance detection sensor.

8. The electronic device of claim 7, wherein the instructions being executable by the at least one processor, further causes the electronic device to, when the difference value between the first AWB parameter and the second AWB parameter is greater than the first threshold value, execute the AWB on the acquired image by applying the first AWB parameter to the first region, and by applying the second AWB parameter to the second region.

9. The electronic device of claim 1, further comprising a distance detection sensor,
wherein the designated scheme includes partitioning the acquired image into a first region frame and a second region frame by using the distance detection sensor.

10. The electronic device of claim 9, wherein the instructions being executable by the at least one processor, further causes the electronic device to, when the difference value between the first AWB parameter and the second AWB parameter is greater than the first threshold value, execute the AWB on the acquired image by applying the first AWB parameter to the first region frame, and by applying the second AWB parameter to the second region frame.

11. A method comprising:
acquiring image by using a camera;
partitioning the acquired image into a first region and a second region according to a designated scheme;
acquiring a first auto-white-balancing (AWB) parameter of the first region and a second AWB parameter of the second region; and
when a difference value between the first AWB parameter and the second AWB parameter is greater than a first threshold value, executing AWB on the acquired image by using both the first AWB parameter and the second AWB parameter,
when the difference value between the first AWB parameter and the second AWB parameter is less than or equal to the first threshold value, acquiring a third AWB parameter of the acquired image and executing the AWB on the acquired image by using the third AWB parameter.

12. The method of claim 11, wherein the designated scheme includes partitioning the acquired image into the first region and the second region by using image segmentation based on machine learning.

13. The method of claim 12, further comprising performing the machine learning based on at least one of red-green-blue (RGB) ratio data and a second threshold value.

14. The method of claim 12, wherein the executing the AWB on the acquired image by using both the first AWB parameter and the second AWB parameter includes: applying the first AWB parameter to the first region and applying the second AWB parameter to the second region.

15. The method of claim 11, wherein the designated scheme includes setting a first region frame and a second region frame within an area of the acquired image, by using image segmentation based on machine learning.

16. The method of claim 15, wherein the executing the AWB on the acquired image by using both the first AWB parameter and the second AWB parameter includes applying the first AWB parameter to the first region frame and applying the second AWB parameter to the second region frame.

17. The method of claim 11,
wherein the electronic device further comprises a distance detection sensor, and
wherein the designated scheme includes partitioning the acquired image into the first region and the second region by using the distance detection sensor.

18. The method of claim 17, wherein the executing the AWB on the acquired image by using both the first AWB parameter and the second AWB parameter includes applying the first AWB parameter to the first region and applying the second AWB parameter to the second region.

19. The method of claim 11,
wherein the electronic device further comprises a distance detection sensor, and
wherein the designated scheme includes partitioning the acquired image into the first region frame and the second region frame by using the distance detection sensor.

20. The method of claim 19,
wherein the executing the AWB on the acquired image by using both the first AWB parameter and the second AWB parameter includes applying the first AWB parameter to the first region frame, and applying the second AWB parameter to the second region frame.

* * * * *